(12) United States Patent
Kolade et al.

(10) Patent No.: US 12,429,321 B2
(45) Date of Patent: Sep. 30, 2025

(54) TAPE MEASURE WITH VARIABLE PREFORMED STRESSED SPIRAL SPRING RETRACTION SYSTEM

(71) Applicant: Milwaukee Electric Tool Corporation, Brookfield, WI (US)

(72) Inventors: Oluwatosin T. Kolade, Ocoee, FL (US); Shih-Chi Chou, Taichung (TW)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/928,684

(22) Filed: Oct. 28, 2024

(65) Prior Publication Data

US 2025/0052554 A1    Feb. 13, 2025

Related U.S. Application Data

(60) Division of application No. 18/329,869, filed on Jun. 6, 2023, now Pat. No. 12,158,338, which is a
(Continued)

(30) Foreign Application Priority Data

Feb. 8, 2017    (CN) .......................... 201710069477.9

(51) Int. Cl.
*G01B 3/10*    (2020.01)
*G01B 3/1005*    (2020.01)
(Continued)

(52) U.S. Cl.
CPC ......... *G01B 3/1005* (2013.01); *G01B 3/1041* (2013.01); *G01B 3/1056* (2013.01);
(Continued)

(58) Field of Classification Search
CPC .. G01B 3/1005; G01B 3/1041; G01B 3/1056; G01B 2003/103; G01B 2003/1038; Y10T 29/49609
See application file for complete search history.

(56) References Cited

U.S. PATENT DOCUMENTS 2,036,720 A * 4/1936 Ritter ................... G01B 3/1041
33/768
2,609,192 A * 9/1952 Lermont ................... B21F 3/08
72/146
(Continued)

FOREIGN PATENT DOCUMENTS

CN    1146009 A    3/1997
CN    2645029 Y    9/2004
(Continued)

OTHER PUBLICATIONS

International Search Report and Written Opinion for International Application No. PCT/US2018/017005, dated May 15, 2018, 10 pages.

*Primary Examiner* — Bayan Salone
(74) *Attorney, Agent, or Firm* — Reinhart Boerner Van Deuren s.c.

(57) ABSTRACT

A tool, such as a tape measure, including a spring-based retraction system is shown. The spring-based retraction system is driven by a spiral spring, that has a variable preformed stress profile along the length of the spring.

8 Claims, 5 Drawing Sheets

Related U.S. Application Data continuation of application No. 17/381,506, filed on Jul. 21, 2021, now Pat. No. 11,709,044, which is a continuation of application No. 15/890,987, filed on Feb. 7, 2018, now Pat. No. 11,092,418, which is a continuation of application No. PCT/US2018/017005, filed on Feb. 6, 2018.

(51) Int. Cl.
  *G01B 3/1041* (2020.01)
  *G01B 3/1056* (2020.01)

(52) U.S. Cl.
  CPC .............. *G01B 2003/103* (2013.01); *G01B 2003/1038* (2013.01); *Y10T 29/49609* (2015.01)

(56) References Cited

U.S. PATENT DOCUMENTS

| | | | | |
|---|---|---|---|---|
| 2,956,795 | A * | 10/1960 | Foster | F16F 1/10 267/156 |
| 3,346,938 | A * | 10/1967 | Becker | G04D 3/0007 968/11 |
| 3,383,772 | A * | 5/1968 | Gardner | G01C 9/34 473/59 |
| 3,439,428 | A * | 4/1969 | Charles | G01B 3/1003 242/405 |
| 3,450,367 | A * | 6/1969 | Edgell | G01B 3/1005 242/381.3 |
| 3,648,378 | A * | 3/1972 | Thingstad | G01C 9/34 33/376 |
| 3,922,790 | A * | 12/1975 | Quenot | G01B 3/1005 242/301 |
| 4,130,943 | A * | 12/1978 | Talbot | G01C 9/28 D10/69 |
| 4,142,693 | A * | 3/1979 | Czerwinski | B65H 75/486 242/375 |
| 4,150,492 | A * | 4/1979 | Tracy | G01C 9/28 33/376 |
| 4,363,171 | A * | 12/1982 | Scandella | G01B 3/1041 33/769 |
| 4,399,616 | A * | 8/1983 | Jansson | G01B 3/08 33/809 |
| 4,402,472 | A * | 9/1983 | Burtscher | H02G 11/02 242/381.3 |
| 4,411,072 | A * | 10/1983 | Rutty | G01B 3/1003 242/405 |
| 4,502,226 | A * | 3/1985 | Hung | G01B 3/1005 33/760 |
| 4,730,783 | A * | 3/1988 | Lamson | G01B 3/1041 242/375 |
| 4,756,087 | A * | 7/1988 | Sing | G01B 3/1005 D10/70 |
| 4,780,783 | A * | 10/1988 | Osawa | G11B 23/045 |
| 4,928,395 | A * | 5/1990 | Good | G01C 9/24 D10/69 |
| 5,210,956 | A * | 5/1993 | Knispel | G01B 3/1005 33/767 |
| 5,388,338 | A * | 2/1995 | Majors | E04F 21/241 33/376 |
| 5,577,327 | A * | 11/1996 | Archambault | G01C 9/28 33/374 |
| 5,617,641 | A * | 4/1997 | Aarhus | G01C 9/26 33/376 |
| 5,699,623 | A * | 12/1997 | Lee | G01B 3/1056 33/758 |
| 6,041,510 | A * | 3/2000 | Huff | G01C 9/26 33/381 |
| 6,053,447 | A * | 4/2000 | Omri | G01B 3/1041 242/381.3 |
| 6,249,986 | B1 * | 6/2001 | Murray | G01B 3/10 33/771 |
| 6,398,145 | B1 * | 6/2002 | Yang | B65H 75/486 242/375 |
| 6,473,986 | B1 * | 11/2002 | Sun | G01B 3/1003 33/757 |
| 6,662,463 | B2 | 12/2003 | Lee | |
| 6,766,588 | B1 | 7/2004 | Hsu | |
| 6,915,585 | B2 | 7/2005 | Von Wedemeyer | |
| 7,107,698 | B2 | 9/2006 | Liao | |
| 7,159,331 | B2 | 1/2007 | Critelli et al. | |
| 7,458,537 | B2 | 12/2008 | Critelli et al. | |
| 10,126,107 | B2 | 11/2018 | Khangar et al. | |
| 10,422,617 | B1 | 9/2019 | Vitas et al. | |
| 10,697,747 | B1 | 6/2020 | Vitas et al. | |
| 10,712,142 | B2 | 7/2020 | Vitas et al. | |
| 2002/0116833 | A1 | 8/2002 | Hollenbeck | |
| 2011/0099828 | A1 | 5/2011 | Hernandez | |
| 2013/0133391 | A1 | 5/2013 | Katsuyama et al. | |
| 2014/0075772 | A1 | 3/2014 | Delneo et al. | |
| 2015/0247716 | A1 | 9/2015 | Craig et al. | |
| 2019/0056208 | A1 | 2/2019 | Khangar et al. | |
| 2019/0063893 | A1 | 2/2019 | Vitas et al. | |
| 2019/0242686 | A1 | 8/2019 | Reddy et al. | |

FOREIGN PATENT DOCUMENTS

| | | | |
|---|---|---|---|
| CN | 1546939 A | 11/2004 | |
| CN | 102006948 | 4/2011 | |
| CN | 203422033 | 2/2014 | |
| CN | 104259779 | 1/2015 | |
| DE | 102013207188 | 10/2014 | |
| EP | 1395792 | 3/2004 | |
| FR | 2715445 | 7/1995 | |
| FR | 2715445 A1 * | 7/1995 | ............. B21D 7/022 |
| GB | 1155287 | 6/1969 | |
| GB | 2371583 | 7/2002 | |
| JP | H0647472 | 2/1994 | |
| JP | H1193076 | 4/1999 | |
| JP | 2003/130601 | 5/2003 | |
| KR | 20040024085 | 3/2004 | |
| KR | 20-0350874 | 5/2004 | |
| KR | 20040088436 | 10/2004 | |
| TW | 479807 U | 3/2002 | |
| TW | 523084 U | 3/2003 | |
| TW | I283291 | 7/2007 | |
| WO | WO8300215 | 1/1983 | |
| WO | WO8702314 | 4/1987 | |
| WO | WO9504915 | 2/1995 | |
| WO | WO9841817 | 9/1998 | |
| WO | WO02101330 | 12/2002 | |
| WO | WO2016177582 | 11/2016 | |

* cited by examiner

TAPE MEASURE WITH VARIABLE PREFORMED STRESSED SPIRAL SPRING RETRACTION SYSTEM

CROSS-REFERENCE TO RELATED PATENT APPLICATIONS

The present application is a divisional of U.S. patent application Ser. No. 18/329,869, filed Jun. 6, 2023, which is continuation of U.S. patent application Ser. No. 17/381,506, now U.S. Pat. No. 11,709,044, filed Jul. 21, 2021, which is a continuation of U.S. patent application Ser. No. 15/890,987, now U.S. Pat. No. 11,092,418, filed Feb. 7, 2018, which is a continuation of International Application No. PCT/US2018/017005 filed on Feb. 6, 2018, which claims the benefit of and priority to Chinese Application No. 201710069477.9 filed on Feb. 8, 2017, which are incorporated herein by reference in their entireties.

BACKGROUND OF THE INVENTION

The present invention relates generally to the field of tools. The present invention relates specifically to a tape measure, measuring tape, retractable rule, etc., that includes a variably stressed spring retraction system.

SUMMARY OF THE INVENTION

One embodiment of the invention relates to a measuring tape that includes a spiral spring coupled between a tape blade and tape measure housing such that the spring stores energy when the tape blade is extended from the housing and releases energy driving retraction of the tape blade. The level of stress (e.g., measured by free coil diameter) varies along the length of the spiral spring.

In specific embodiments, the spiral spring has an inner end, an outer end, a length extending between the inner end and the outer end, and a first length section adjacent the outer end. The stress within the first length section, as measured by free coil diameter, decreases along the length of the first length section. In such embodiments, because free coil diameter is inversely proportional to the stress within the spring, the free coil diameter increases along the length of first length section. In specific embodiments, the free coil diameter increases in a direction toward the outer end of the spiral spring.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide a further understanding and are incorporated in and constitute a part of this specification. The drawings illustrate one or more embodiments and together with the description serve to explain principles and operation of the various embodiments.

DETAILED DESCRIPTION

Figure 1:
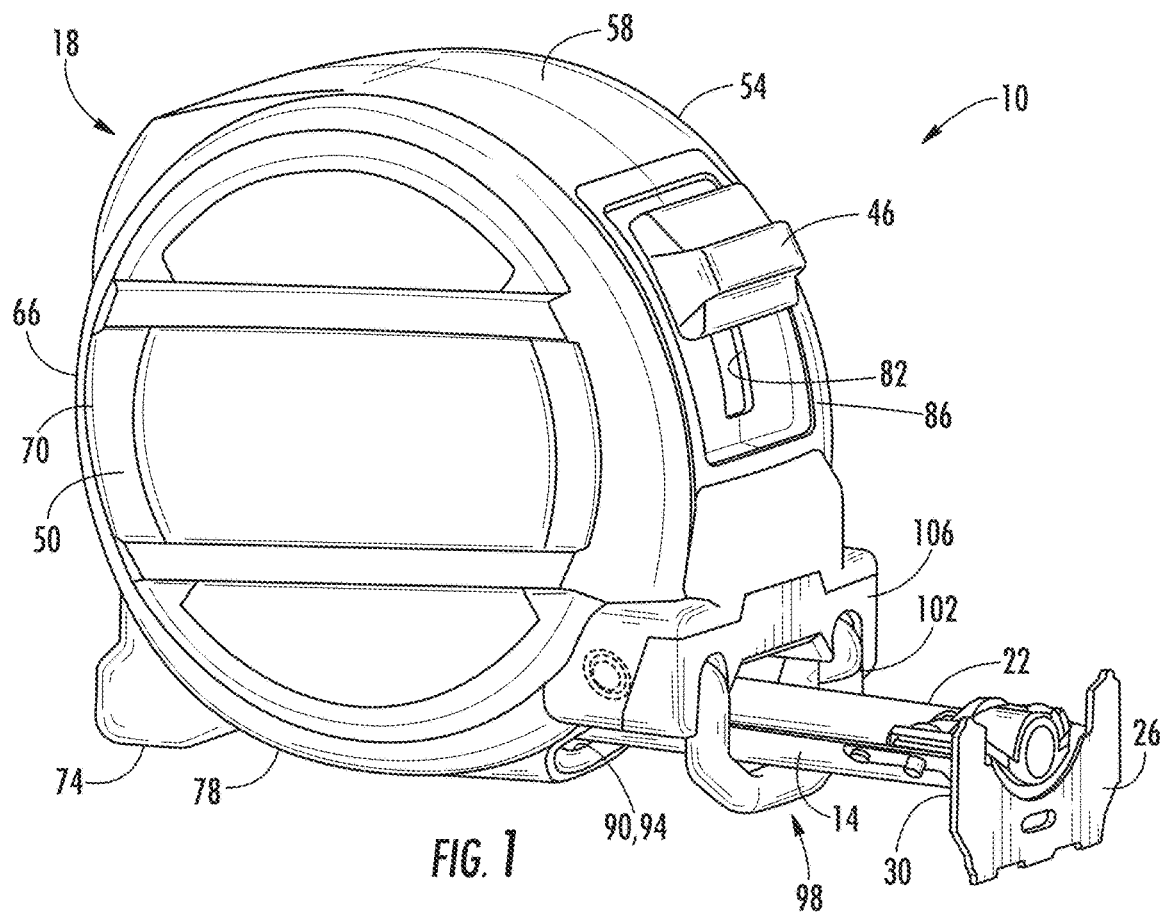
FIG. 1 is a left side perspective view of a tape measure, according to an exemplary embodiment.

Referring generally to the figures, a variably pre-stressed spiral spring for a tape measure retraction system and associated manufacturing method are shown, according to exemplary embodiments. Various embodiments of the tape measure discussed herein include an innovative retraction system including a variably stressed spiral spring designed to provide for a variety of desired retraction characteristics, including decreased tape retraction speeds and tape acceleration.

As will generally be understood, in certain tape measure designs, a spring stores energy during tape blade extension, and applies force to a reel causing the tape blade to wind back on to a reel during tape blade retraction. Various aspects of spring design, such as spring energy, torque profile, spring constant, etc., are selected to ensure that operation of the spring causes a satisfactory level of tape retraction. In such tape measures, the spring design is a function of a variety parameters that relate to retraction of the tape measure blade, including tape measure blade width, length, shape and material, friction within the tape measure spool/retraction system, mechanical efficiency of translation of spring energy to tape blade retraction, the desired speed/acceleration of the tape measure blade during retraction, etc. Thus, for a given set of tape measure mechanical parameters and a given desired retraction speed/acceleration, the spring system within the tape measure needs to store and release a given amount of energy during tape retraction.

In typical tape measure designs, a spiral spring is used to provide the retraction energy, and in such designs, spiral spring length and/or width is the typical spring parameter adjusted to provide more or less retraction energy as needed for the particular design. For example, in such conventional tape measures, a longer or wider spiral spring is typically used to generate retraction force needed for a longer tape measure blade, a heavier tape measure blade, a faster retraction speed, etc.

As discussed herein, Applicant has designed various innovative tape measure blade retraction systems that utilizes a spiral spring having a level of pre-induced or preformed stress that varies along the length of the spiral spring. In particular, the level of preformed stress is decreased in an outer segment of the spiral spring adjacent the reel or spring housing. Applicant believes that by variably decreasing the level of preformed stress present in portions of the tape measure spiral spring, such as in the outer segment, the maximum torque delivered by the spring can be decreased and the slope of torque profile can be decreased, while at the same time delivering a sufficiently high starting or preload torque.

As will be understood, the free coil diameter of the pre-stressed portion of the spring is inversely related to the torque delivered by the pre-stressed spring portion. Thus, in the embodiments discussed herein, the spiral spring has a free coil diameter that increases in sections of the spring adjacent the outer most end (i.e., the case end) of the spring, which forms a spiral spring with a lower maximum torque and a flatter torque profile as compared to a standard tape measure spring that does not having decreasing stress levels near its outer end. Applicant believes that this arrangement decreases maximum retraction speed which in turn decreases the force with which the tape blade hook hits the tape housing and may also decrease/eliminate whip that may otherwise occur in the last several feet of tape retraction.

Figure 2:
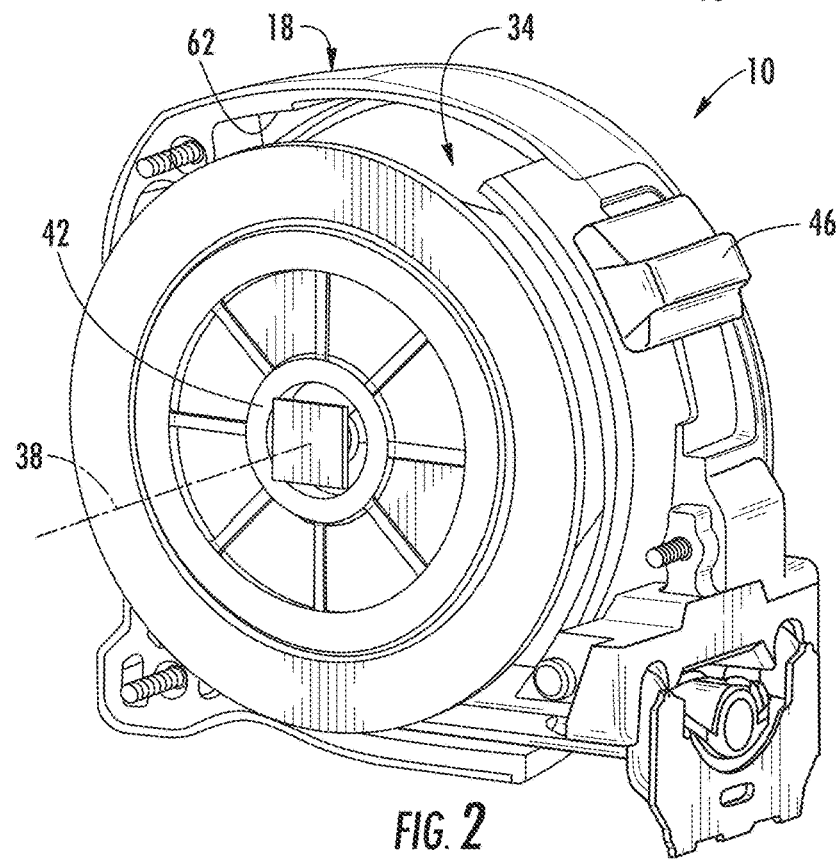
FIG. 2 is a right side perspective view of the tape measure of FIG. 1, according to an exemplary embodiment.

Referring to FIG. 1 and FIG. 2, a length measurement device, such as tape measure 10, is shown according to an exemplary embodiment. Tape measure 10 includes a coilable tape blade 14 and a housing 18. In general, tape blade 14 is an elongate strip of material including a plurality of graduated measurement markings, and in specific embodiments, tape blade 14 is an elongate strip of metal material (e.g., steel material) that includes an outer most end coupled to a hook assembly, shown as hook assembly 26. Tape blade 14 may include various coatings (e.g., polymer coating layers) to help protect tape blade 14 and/or the graduated markings of the blade.

As shown in FIG. 1, a variable-length extended segment 22 of the tape blade 14 is retractable and extendable from the housing 18. As will be explained in more detail below, retraction of tape blade 14 is provided by a variably pre-stress spiral spring. A hook assembly 26 is fixedly coupled to an outer end portion 30 of tape blade 14.

As shown in FIG. 2, the non-extended portion of tape blade 14 is wound onto a reel 34, which is surrounded by housing 18. Reel 34 is rotatably disposed about an axis 38 of tape measure 10, and a retraction mechanism 42 is coupled to reel 34 and configured to drive reel 34 about rotation axis 38 which in turn provides powered retraction of tape blade 14. Retraction mechanism 42 includes an elongated spiral spring that provides the retraction energy to retraction mechanism 42, and, as will be discussed in more detail below, the spiral spring is variably stressed along its length. A tape lock 46 is provided to selectively engage tape blade 14, which acts to restrain retraction mechanism 42 such that extended segment 22 of tape blade 14 remains at a desired length.

Referring to FIG. 1, housing 18 includes a first side wall 50, a second side wall 54, and a peripheral wall 58 connecting first side wall 50 and second side wall 54. First side wall 50, second side wall 54, and peripheral wall 58 define an internal cavity 62, shown in FIG. 2, in which reel 34 and retraction mechanism 42 are housed. Referring to FIG. 1, first side wall 50 and second side wall 54 has a substantially circular profile 66. In other embodiments, the side walls may be rectangular, polygonal, or any other desired shape. Portions of the housing 18 may be co-molded or separately formed of a resilient material, such as a natural or synthetic rubber. In the illustrated construction, housing 18 is formed with housing bumpers 70 and a support leg 74 which extends from a lower portion 78 of the peripheral wall 58.

A slot 82 is defined along a forward portion 86 of peripheral wall 58. Slot 82 provide an opening in the tape measure housing which allows tape lock 46 to extend into housing 18. In addition, slot 82 provides a length sufficient to allow tape lock 46 be moved relative to housing 18 between locked and unlocked positions.

Below the slot 82, a tape port 90 is provided in peripheral wall 58. Tape port 90 has an arcuate shape 94, corresponding to an arcuate cross-sectional profile of tape blade 14. The tape port 90 allows for the retraction and extension of tape blade 14 to and from the internal cavity 62 defined within housing 18.

As shown in FIGS. 1 and 2, tape measure 10 includes a finger guard assembly 98. Finger guard assembly 98 includes a guard 102 and a guard support member 106. As shown in FIG. 1, the portions of guard 102 external to housing 18 are substantially U-shaped and extend downward from housing 18. As shown in FIG. 2, when tape 14 is in the retracted position, a rear surface of hook assembly 26 abuts guard 102. As will be explained in more detail below, in at least some embodiments, the spiral spring of retraction system 42 is configured via the variable preformed stress to decrease maximum torque and/or the slope of torque applied to reel 34/tape 14 during retraction when the tape hook 26 nears guard 102. This decrease in maximum torque results in a lower maximum retraction speed of tape blade 14 which in turn decreases the force hook assembly 26 experiences when hook 26 contacts guard 102 upon full retraction of tape blade 14.

Figure 3:
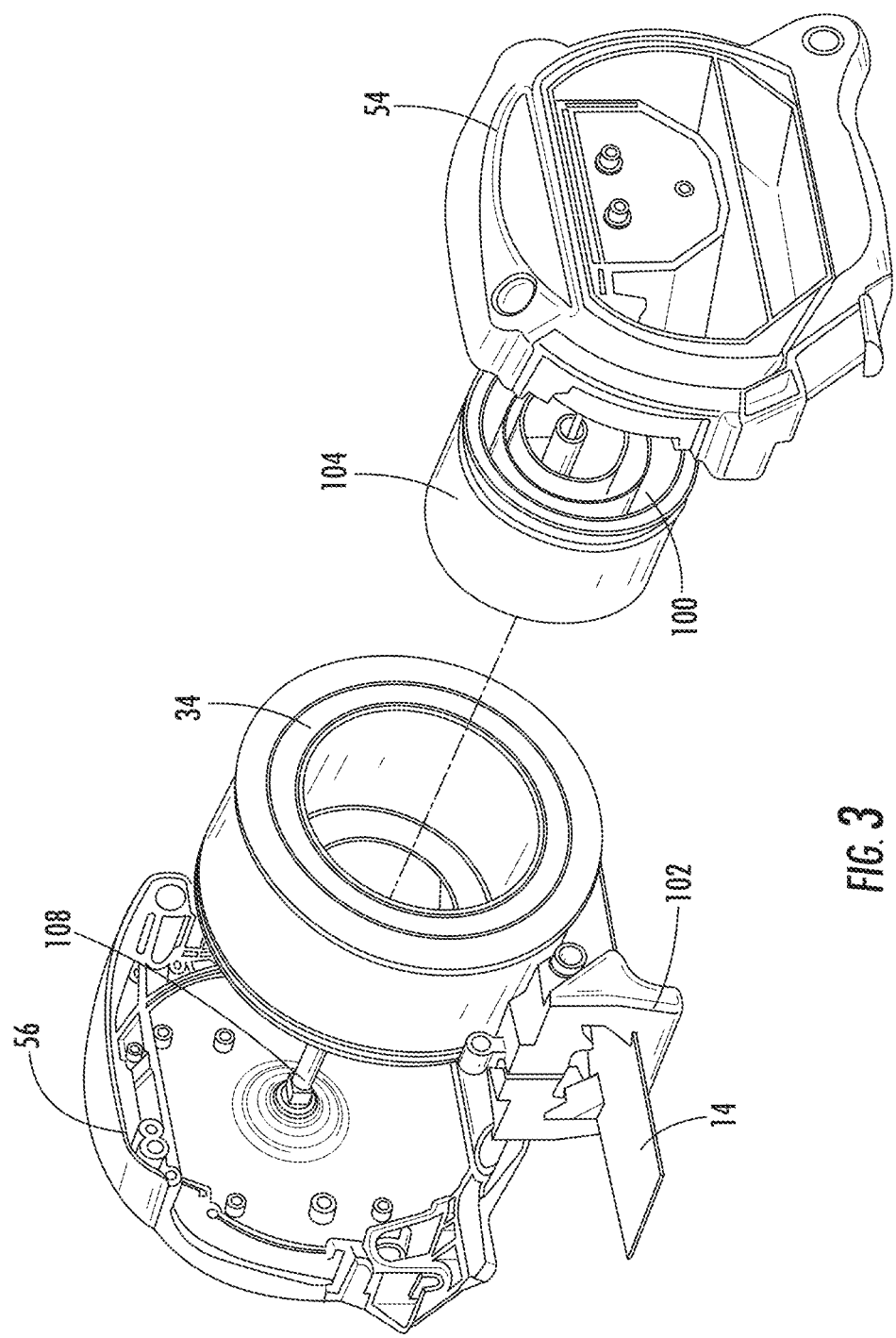
FIG. 3 is an exploded view of the tape measure of FIG. 1 showing a variably stressed spiral spring, according to an exemplary embodiment.

Referring to FIG. 3, an exploded view of tape measure 10 is shown according to an exemplary embodiment. Tape measure 10 includes a spring, shown as spiral spring 100. In general, spiral spring 100 is coupled between a post 108 and tape blade 14 (or reel 34) such that spiral spring 100 stores energy during extension of tape 14 and releases energy driving rewinding of tape blade 14 onto tape reel 34 during retraction of tape blade 14. In some embodiments, spiral spring 100 is mounted within a spring spool 104 located within reel 34. In other embodiments, spiral spring 100 is mounted directly within reel 34.

Figure 4:
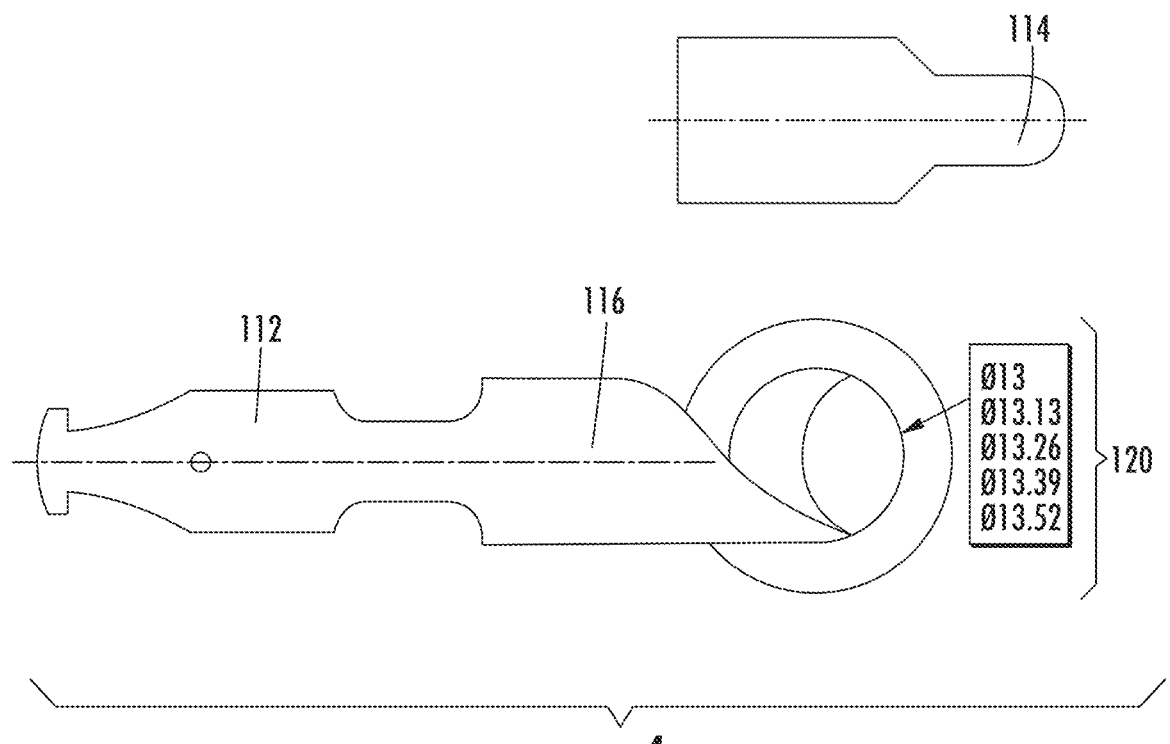
FIG. 4 is a top view of a metal ribbon for forming a variably stressed spiral spring, according to an exemplary embodiment.

Referring to FIG. 4, a pre-stressed coil of steel material 110 used to form spiral spring 100 is shown. Spiral spring material 110 is an elongate strip or ribbon of resilient material (e.g., metal material, steel material, etc.) having a central body section 116 extending between a first end portion 112 and a second end portion 114. As will be understood, when assembled into tape measure housing 18, spiral spring 100 is wound into spring spool 104 or reel 34 such that first end 112 is coupled to tape blade 14 or reel 34, and second end 114 is coupled to post 108 (or otherwise coupled to housing 18). As shown in FIG. 4, end 112 has a tabbed shape facilitating frictional coupling with receiving holes or slots in tape 14 or reel 34, and similarly, end 114 has a tabbed shape facilitating frictional coupling with receiving holes or slots in post 108.

As shown in FIG. 4, spring material 110 is formed such that the metal material has decreasing preformed stress levels that vary along at least a portion of its length, shown as decreasing stress section 120. FIG. 4 shows decreasing stress section 120 in terms of the level of preformed stress formed within spring material 110 (and consequently in spring 100), measured in free coil diameter, at different portions along its length, adjacent end 112 (which becomes the outer end of spring 100 when installed into reel 34). As shown representatively in FIG. 4, decreasing stress section 120 has a free coil diameter at position 1 of 13 mm, at position 2 of 13.13 mm, at position 3 of 13.26 mm, at position 4 of 13.39 mm and at position 5 of 13.52 mm. In this specific embodiment, position 5 is located adjacent end 112, position 4 is located inward along the length of spring 100 from position 5, and so forth.

In other embodiments, the free coil diameter near the outer end of spring 100 is substantially greater than the free coil diameter of a main or central portion of spring 100. In some embodiments, the free coil diameter of at least one segment of spring 100 adjacent outer end of spring 100 is 2×, 4×, 5×, 20×, 50×, 75×, or 100× of the free coil diameter of the main or central portion of spring 100. In specific embodiments, the free coil diameter of a section within 1 meter of the outer end 112 of spring 100 is 20 mm, is 50 mm, is 100 mm and is 1000 mm. In specific embodiments, the free coil diameter of a section of spring 100 within 1 meter of the outer end 112 of spring 100 is between 20 mm and 1000 mm, is between 50 mm and 1000 mm, is between 20 mm and 100 mm or is between 50 mm and 500 mm. In some such embodiments, the free coil diameter of the central portion of spring 100 is between 10 mm and 20 mm, and specifically between 13 mm and 15 mm. In some such embodiments, these identified free coil diameters are average free coil diameters along the length of the spring section within 1 meter of the outer end 112 of spring 100. In some other embodiments, these identified free coil diameters are discreet free coil diameters measured at at least one location along the length of the spring section within 1 meter of the outer end 112 of spring 100.

In various embodiments, the length of the central portion of spring 100 is greater than the length of the section of spring 100 having the lower, decreasing preformed stress. In various embodiments, the length of central portion is at least 5×, specifically at least 10× and more specifically at least 50×, of the length of the section of spring 100 adjacent outer end 112 that has the lower, decreasing preformed stress.

Figure 5:
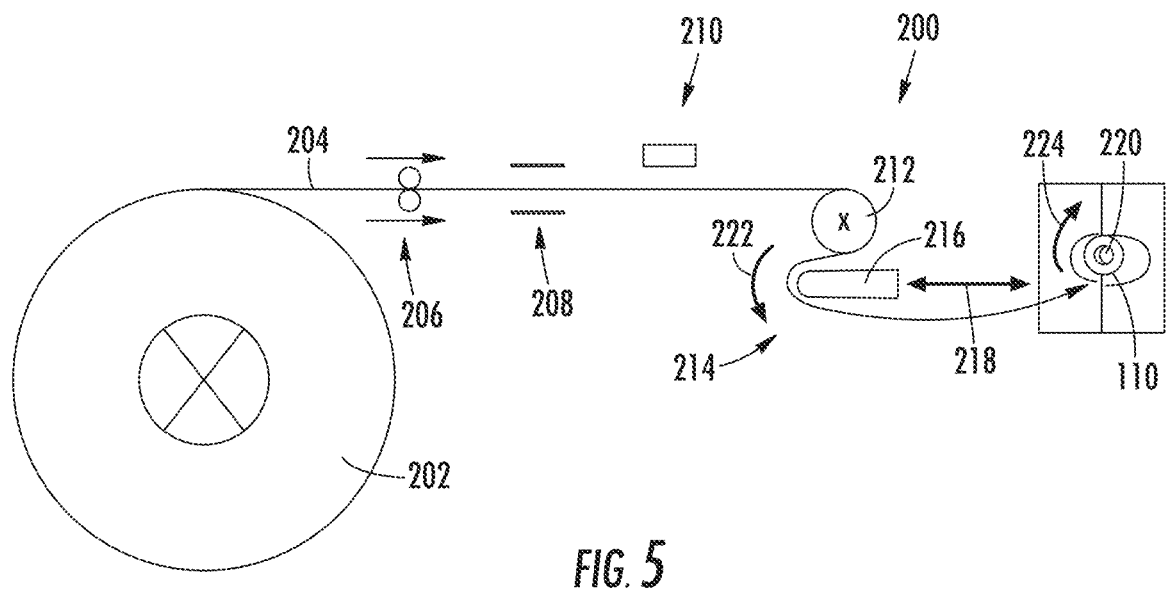
FIG. 5 is a schematic view showing the manufacture of a variably stressed spiral spring, according to an exemplary embodiment.

Referring to FIG. 5, a system 200 and related method for forming a variably stressed spiral spring, such as spring 100, is shown according to an exemplary embodiment. System 200 includes a supply 202 of a metal sheet (e.g., steel ribbon) or ribbon material 204. The metal ribbon 204 is paid off of supply 202 and moves through a smoothing station, shown as opposing calendaring rollers 206. Next, metal ribbon 204 is heated in a heating station 208, and tabbed ends 112 and 114 are formed in to ribbon 204 at a stamping station 210.

Next, metal ribbon 204 passes around a roller 212 and moves into a stressing station 214. Stressing station 214 is configured to form different levels of preformed stress in different portions of metal ribbon 204 as ribbon passes through station 214. In the embodiment shown, stressing station 214 includes a bar 216 that engages ribbon 204 at different positions which causes different levels of deformation in ribbon 204. This differential deformation relates to the varying level of stress formed along the length of spring 100 when wound into tape measure housing 18.

In this embodiment, bar 216 moves relative to ribbon 204 in the direction of arrow 218. Bar 216 is moved toward ribbon 204 decreasing the bend radius induced in ribbon 204 as ribbon 204 moves around bar 216. Decreasing the bend radius via bar 216 acts to increase deformation in ribbon 204, and therefore, increases stress formed in a particular lengthwise position of ribbon 204 such that the more highly deformed portion of ribbon 204 has a lower free coil diameter (i.e., is more tightly wound). Conversely, as bar 216 is moved away from ribbon 204, the bend radius induced in ribbon 204 as ribbon 204 moves around bar 216 increases. Increasing the bend radius via bar 216 acts to decrease deformation, and therefore, decreases stress formed in a particular lengthwise position of ribbon 204 such that the less deformed portion of ribbon 204 has a lower free coil diameter (i.e., is less tightly wound). Thus, in this embodiment, by altering the position of bar 216 relative to ribbon 204 different levels of stress are formed at different lengthwise positions along the length of ribbon 204.

Following stressing station 214, ribbon 204 is then wound into a storage device around arbor 220, forming spring material 110. In the schematic of FIG. 5, ribbon 204 is wound around arbor 220 in a direction opposite from the direction of the bend introduced by bar 216 within stressing station 214. Thus, in the orientation of FIG. 5, ribbon 204 is bent around bar 216 in the counterclockwise direction represented by arrow 222, and is wound around arbor 220 in the clockwise direction represented by arrow 224.

Figure 6:
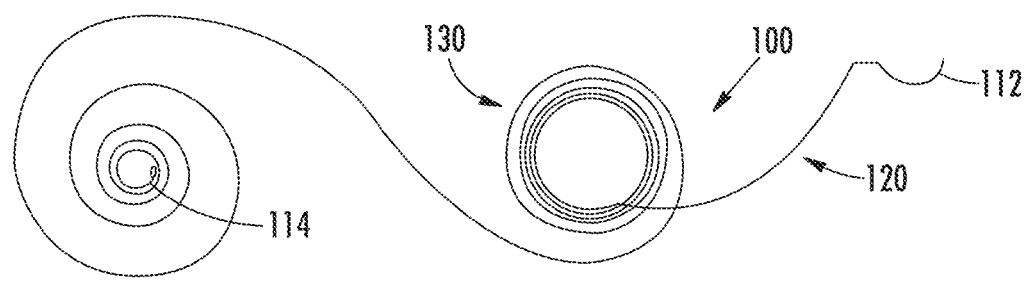
FIG. 6 is a schematic view of variably stressed spiral spring in the free state, according to an exemplary embodiment.

Referring to FIG. 6, spring 110 is shown in the free or relaxed state prior to being wound into reel 34. As shown in FIG. 6, spring 110 has a main or central section 130 having a substantially constant free coil diameter that occupies most of the length of spring 110. As shown in FIG. 6, low stress area 120 has a free coil diameter that is significantly larger than that of section 130.

Figure 7:
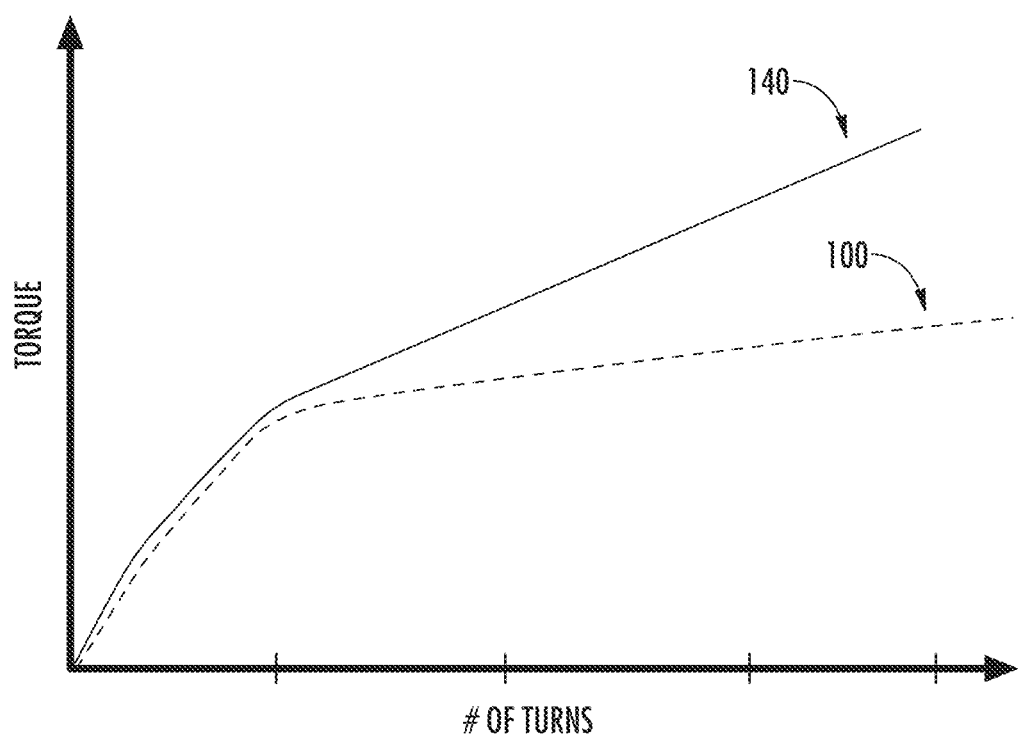
FIG. 7 is a representative torque profile of a variably stressed spiral spring compared to a typical tape measure spring, according to an exemplary embodiment.

FIG. 7 shows a representative torque profile graph of a standard tape measure spring having a constant free coil diameter as plot 140, and a representative torque profile graph of spring 100. In the embodiment shown, the spring represented by plot 140 is the same as spring 110 (e.g., same material, width, thickness, length, etc.) except for the varying lowered stress level as discussed herein. As can be seen in FIG. 7, the maximum torque applied by spring 100 is less than the maximum torque of the spring represented by plot 140, and the slope of the torque profile applied by spring 100 is less than that of plot 140.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, rigidly coupled refers to two components being coupled in a manner such that the components move together in fixed positional relationship when acted upon by a force.

Various embodiments of the invention relate to any combination of any of the features, and any such combination of features may be claimed in this or future applications. Any of the features, elements, or components of any of the exemplary embodiments discussed above may be utilized alone or in combination with any of the features, elements, or components of any of the other embodiments discussed above.

What is claimed is:

1. A system for forming a variably stressed spiral spring for a tape measure, the system comprising:
    a supply of a ribbon material;
    a smoothing station including a pair of calendaring rollers;
    an end roller;
    a heating station positioned between the smoothing station and the end roller;
    a storage device; and
    a stressing station positioned between the end roller and the storage device, the stressing station configured to form different levels of preformed stress in different portions of the ribbon material as the material passes through the stressing station;
    wherein the storage device includes an arbor configured to store the ribbon material when wound to form a spiral spring.

2. The system of claim 1, wherein the stressing station comprises a bar configured to engage and deform the ribbon material, wherein the bar is movable relative to the ribbon material in a first direction towards the end roller and a second direction opposing the first direction and away from the end roller.

3. The system of claim 2, wherein, when the bar is in a first position the bar engages a first segment of the ribbon material such that a first level of stress is induced in the ribbon material.

4. They system of claim 3, wherein, when the bar is in a second position, the second position spaced a distance in the second direction from the first position, the bar engages a second segment of the ribbon material such that a second level of stress is induced in the ribbon material.

5. The system of claim 4, wherein the second level of stress is less than the first level of stress.

6. The system of claim 4, wherein the first segment has a first deformation and the second segment has a second deformation and wherein the second deformation is less than the first deformation.

7. The system of claim 1, wherein the ribbon material is formed from a steel material.

8. The system of claim 1, further comprising a stamping station, wherein the stamping station is positioned between the heating station and the end roller, wherein the stamping station is configured to produce a first tabbed shaped end on the ribbon material and a second tabbed shaped end opposing the first tabbed shaped end.

* * * * *